United States Patent
Katayama

(10) Patent No.: US 6,317,293 B1
(45) Date of Patent: Nov. 13, 2001

(54) MAGNETIC HEAD SLIDER

(75) Inventor: Masaki Katayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/264,098

(22) Filed: Mar. 8, 1999

(30) Foreign Application Priority Data

Mar. 12, 1998 (JP) .................................................. 10-061349

(51) Int. Cl.[7] .............................. G11B 5/60; G11B 15/64; G11B 17/32; G11B 21/20
(52) U.S. Cl. ........................................................ 360/235.4
(58) Field of Search .............................. 360/235.1, 235.2, 360/235.3, 235.4, 234.3, 234, 230, 122

(56) References Cited

U.S. PATENT DOCUMENTS

| | | | |
|---|---|---|---|
| 5,617,273 | * 4/1997 | Carr et al. | 360/103 |
| 5,675,461 | * 10/1997 | Aylwin et al. | 360/126 |
| 5,986,851 | * 11/1999 | Angelo et al. | 360/103 |
| 5,999,368 | * 12/1999 | Katayama | 360/103 |
| 6,038,101 | * 3/2000 | Yoda et al. | 360/103 |

FOREIGN PATENT DOCUMENTS

| | | |
|---|---|---|
| 8203053 | 8/1996 | (JP) . |
| 922519 | 1/1997 | (JP) . |
| 981924 | 3/1997 | (JP) . |

* cited by examiner

Primary Examiner—Robert S. Tupper
Assistant Examiner—Julie Anne Watko
(74) Attorney, Agent, or Firm—Greer, Burns & Crain, L

(57) ABSTRACT

After a sacrifice layer 51 has been formed on a substrate 50, there are formed a protective layer 41, flying surface layer 42, head element layer 43 and actuator layer 44. Further, a slider body 45 is formed by means of plating, and then the sacrifice layer 51 is removed so that the slider body can be separated from the substrate 50. In the thus obtained magnetic head slider 40, when an actuator 40a is loaded or unloaded, a frictional force, generated when the head element 43 is made to come close to or contact with a recording medium, is reduced and the head element 43 can accurately follow a track on the recording medium. A portion of the head element layer 43 forms at least one protrusion 46 which protrudes from a surface opposed to the recording medium onto the recording medium side.

10 Claims, 7 Drawing Sheets

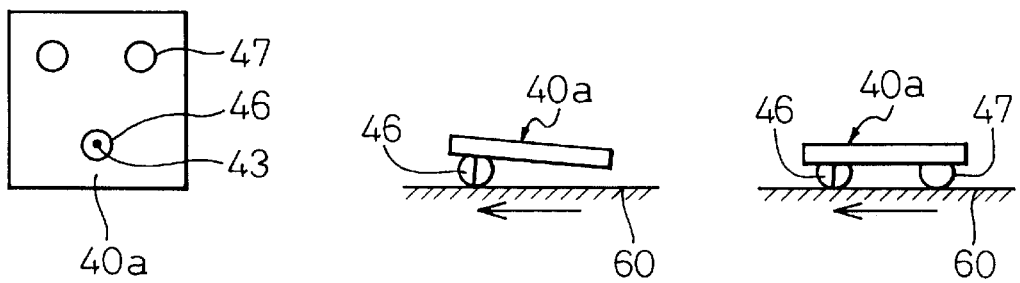
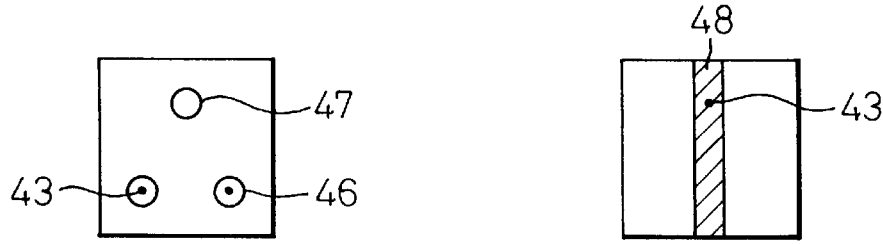

MAGNETIC HEAD SLIDER

BACKGROUND OF THE INVENTION

1. Field of the Invention

The present invention relates to a magnetic head slider used for a magnetic disc unit and a manufacturing method therefor.

In recent years, the magnetic disc unit has been made compact, its performance has been highly enhanced, and its cost has been reduced. In accordance with this recent tendency, it is desired to develop a thin film magnetic head of high performance and low cost. In order to meet the demand, a horizontal magnetic head (planar magnetic head), is proposed in which a thin film pattern forming surface is arranged in parallel with a flying surface. The reason is described as follows. In the case of a horizontal magnetic head, it is easy to form flying rails having specific shapes. Therefore, it is possible to realize a magnetic head capable of flying stably close to the disc surface, and further it is easy to reduce a portion to be machined in the manufacturing process. Therefore, the cost can be lowered.

In accordance with an increasing demand for enhancing the density of magnetic recording and also in accordance with an increasing demand for reducing the sizes of the head element and the magnetic head slider, problems occur in machining and handling.

2. Description of the Related Art

For the above reasons, there has been proposed a magnetic head slider which can be manufactured without being machined. This magnetic head slider is disclosed in Japanese Unexamined Patent Publication No. 9-81924, the title of which is "Thin film magnetic head slider and electrostatic actuator thereof".

The above prior art will be explained below.

FIGS. 1(a) to 1(c) are views showing a thin film magnetic head slider of the prior art. FIG. 1(a) is a perspective view of the slider 10 attached to the head suspension 30, seen from the flying surface side. FIG. 1(b) is a perspective view of the slider 10, seen from the back (opposite side to the flying surface) thereof, before the slider 10 is attached to the head suspension 30. FIG. 1(c) is a cross-sectional view taken on line B–B' in FIG. 1(b).

A portion of the flying surface layer (air bearing surface) 11 made of $SiO_2$ or $Al_2O_3$ protrudes onto the flying surface side of the slider 10 which is opposed to a recording medium not shown in the drawing. This protruding portion forms two flying rails 15 which extend from the inflow end 13 to the outflow end 14 with respect to the recording medium moving in the direction of arrow A. On the leading end 13 side between the two flying rails 15, there is provided a central rail 17. Metallic plating of Ni is conducted on the main body 12 of the slider 10 formed on the back of the flying surface layer 11, and also metallic plating of Ni is conducted on the terminal pad section 18 shown in FIG. 1(b).

The element drive mechanism section 20 (tracking mechanism) is formed in a portion between the two flying rails 15 and also between the terminal pad section 18 and the trailing end 14. That is, the portion of the tracking mechanism section 20 is subjected to plating of Ni in the same manner as that of the main body 12 of the slider 10.

As shown in the cross-sectional view of FIG. 1(c), the tracking mechanism section 20 utilizes an electrostatic attraction force. The moving piece is composed of two parallel springs 21 (only one spring is shown in the drawing) extended from the stationary section and an element mount section 22 supported at the forward end of the parallel springs 21. The parallel springs 21 of the movable piece and the stationary piece 23, which is opposed to the parallel springs 21, are made of a metal such as Ni or Cu. Alternatively, the movable piece and the stationary piece are respectively provided with metallic electrodes at the portions opposed to each other. When voltage is impressed between the stationary piece electrode 23 and the movable piece electrode 21, an attraction force is generated, so that tracking can be conducted by the attraction force.

In this connection, concerning the movable piece, only the head element 24 or the forward end 24a of the magnetic pole of the head element is protruded onto the recording medium (not shown) side. Therefore, the drive electrode sections 21, 23 are separate from the recording medium. The reason is to avoid an influence of the drive section on the flying force of the slider 10 and also to avoid the attraction of dust to the head element 24 by the voltage impressed between the electrodes 21, 23.

FIG. 2 is a view showing another example of the electrostatic actuator of the prior art. The outer frame is composed of a stationary section 31 which is formed by means of plating of Ni. On the inner wall of the stationary section 31, there are provided teeth 31a which are arranged toward the inner circumference in parallel to each other. These teeth 31a are formed by means of plating of Ni simultaneously when the stationary section 31 is formed. These teeth 31a may be fixed to the substrate, or alternatively these teeth 31a may be arranged in such a manner that a gap (not shown) may be formed between these teeth 31a and the substrate. A central portion located inside the stationary section 31 is the movable section 32 formed by means of plating of Ni simultaneously when the stationary section 31 is formed. The movable section 32 is arranged in such a manner that it can be relatively moved with respect to the stationary section 31 while a gap (not shown) is provided between the movable section 32 and the substrate. In the movable section 32, there are provided a plurality of teeth 32a at positions shifted from the centers of the teeth 31a, which are arranged in parallel to each other in the stationary section 31, and these teeth 32a are arranged in parallel to the teeth 31a. In the drawing, at an upper portion and a lower portion of the movable section 32, there are provided supports 33 fixed to the substrate, and also there are provided support springs 34, by which the movable section 32 can be moved only in the upward and downward direction in the drawing, between the supports 33 and the movable section 32. Lead wires 35, 36, to be connected to terminals not shown in the drawings, are formed by means of plating of Ni at the right lower portion of the stationary section 31 and the support on the lower side.

When voltage is impressed between the two lead wires 35, 36, an electrostatic attraction force is generated between the teeth 31a of the stationary section 31 and the teeth 32a of the movable section 32. The movable section 32 is attracted upward by this electrostatic attraction force and moved to a position at which the electrostatic attraction force is balanced with a restoring force of the support spring 34. Since the attraction force is proportional to the square of an electric potential difference, the movable section 32 is moved in the same direction irrespective of the polarity.

In order to prevent the occurrence of a short circuit at the teeth 31a of the stationary section 31 with the teeth 32a of the movable section 32 when an excessively high voltage input is given, a stopper 37 is arranged in a portion of the support 33 by reducing a gap between the support 33 and the movable section 32.

Next, referring to FIGS. 3 to 5, a method of manufacturing the magnetic head slider of the above conventional example disclosed in Japanese Unexamined Patent Publication No. 9-81924 will be explained below. FIG. 3 is a view showing a magnetic head slider of another conventional type. However, only the shape and arrangement of the rails are different from those of the magnetic head slider shown in FIG. 1(a), and the manufacturing method is the same. FIG. 4 is a cross-sectional view taken on line C–C' in FIG. 3, and FIGS. 5(a) to 5(d) are views showing a manufacturing process.

In FIG. 3, this magnetic head slider conducts reading and writing in such a manner that the electrostatic actuator 40a (from the protective layer 41 to the actuator layer 44), on which the horizontal head element is mounted, drives in the tracking direction (direction X in FIG. 3), so that the magnetic slider follows a track on the medium (not shown in the drawing). Since the magnetic head slider follows the track, the track pitch can be reduced and the recording density can be enhanced.

The electrostatic actuator 40a can be moved upward and downward (direction Z in FIG. 3), so that the head element can be loaded and unloaded. That is, when reading and writing is conducted, the head element 43 is made to come close to a recording medium, i.e., closely flying on it, or alternatively the head element 43 is made to come into contact with the recording medium. At any other time, the head element 43 is separated from the recording medium. Since only the head element 43 is made to come close to the recording medium, it is possible to ensure a flying distance of the slider 40 itself, and the recording density can be enhanced while the slider 40 is stably flying above the recording medium.

A method of manufacturing the actuator of this magnetic head slider 40 will be explained as follows.

(1) A sacrifice layer 51 (for example Al film) is formed on the substrate 50, and a protective layer 41 (for example, diamond-like carbon (DLC) film) and a flying surface layer 42 (for example, SiO$_2$ film) are formed on the sacrifice layer 51 as shown in FIG. 5(a).

(2) A hole 52 is formed, so that the hole 52 penetrates the flying surface layer 42 and the protective layer 41 and stops on the sacrifice layer 51. In order to form this hole 52, for example, ion milling or reactive etching is used as shown in FIG. 5(b).

(3) A head element 43 is formed so that a leading end portion of the head element 43 can come into hole 52 as shown in FIG. 5(c).

(4) An actuator layer 44 and a slider body 45 are formed by means of plating (for example, plating of Ni) on the head element layer 43 via a plated base. Due to the foregoing, a magnetic head slider 40 having an actuator is formed on the substrate 50 as shown in FIG. 5(d).

(5) When the sacrifice layer 51 is removed by etching, for example, by etching in a solution of KOH, the magnetic head slider 40 is separated from the substrate 50. In this way, the magnetic head slider 40 can be completed as shown in FIG. 4.

At this time, on the surface of the slider 40 which is opposed to a recording medium, a forward end portion of the head element 43 protrudes to the same surface as that of the protective film 41.

In this connection, the actuator layer 44 in FIGS. 4 and 5 corresponds to the head mounting section 22 shown in FIG. 1(c) or the movable section 32 shown in FIG. 2. The actuator layer 44 supports the head element so that the head element can be moved in the tracking direction (direction X in FIG. 3) and the upward and downward direction (direction Z in FIG. 3 which is the loading and unloading direction) as described before.

Another prior art device is disclosed in Japanese Unexamined Patent Publication No. 8-203053. According to this prior art reference, the contact force of the magnetic head with the magnetic disc, which is a recording medium, is controlled. In order to keep the contacting condition of the magnetic head with the magnetic disc stable, an air gap is formed between the primary slider and the auxiliary slider, and the intensity of the contact force of the magnetic head slider with the magnetic disk is adjusted by controlling the voltage impressed upon the electrode provided in the air gap.

According to still another prior art reference, Japanese Unexamined Patent Publication No. 9-22519, in order to read and write on a magnetic disk of high track density, an inching mechanism by which a recording element and a reproducing element can be relatively moved, is provided.

In the magnetic head slider described in the above Japanese Unexamined Patent Publication No. 9-81924, when the electrostatic actuator 40a is loaded and unloaded, the head element 43 is made to come close to the recording medium. When the head element 43 contacts the recording medium, the entire electrostatic actuator 40a comes into contact with the recording medium, and reading and writing is conducted by the head element 43. When the head element 43 is made to come close to the recording medium, a collision occurs. At this time, the same thing as that caused in the case of contact occurs. At this time of contact, when the electrostatic actuator 40a is driven into the tracking direction, a frictional force is caused resisting the drive force of the electrostatic actuator 40a.

On the other hand, reading and writing is conducted in such a manner that the electrostatic actuator 40a drives the head element 43 in the tracking direction so that the head element 43 can follow the track on the recording medium. Therefore, it is preferable that the intensity of the load or the resistance is as low as possible. However, the above frictional force sufficiently resists the drive force of the electrostatic actuator 40a . Therefore, the quantity of displacement is decreased by the resistance of the frictional force. For the above reasons, it is impossible for the head element 43 to follow the track accurately.

SUMMARY OF THE INVENTION

Accordingly, an object of the present invention is to provide a magnetic head slider and a method of manufacturing it, in which the electrostatic actuator of the head slider is loaded and unloaded so as to make the head element 43 come close to or contact a recording medium; and an intensity of the frictional force generated between the entire electrostatic actuator 40a and the recording medium at this time can be reduced.

According to the present invention, there is provided a magnetic head slider adapted to be opposed to a recording medium and comprising: an actuator section comprising a protective film, a flying surface layer, a head element layer and an actuator layer; and a slider body section; wherein said head slider is made by forming a sacrifice layer on a substrate, then forming on the sacrifice layer the protective layer, the flying surface layer, the head element layer and the actuator layer, in addition forming a slider body layer on the actuator layer, then removing the sacrifice layer to separate the head slider from the substrate so that the protective film defines a medium opposing surface for opposing against a recording medium; characterized in that a part of the head element layer is provided with at least one projection protruding toward the recording medium from the medium opposing surface.

According to the present invention, there is formed at least one protrusion in which a portion of the head element layer protrudes onto the recording medium side. Therefore, when the actuator comes close to or comes into contact with the recording medium, the frictional force is reduced, and the head element can follow the track on the recording medium accurately.

The protective film is provided at a peripheral area around the projection with a first portion protruding toward the recording medium from the medium opposing surface so that the portion defines a part of the projection. In this connection, the flying surface layer is provided at a peripheral area around the projection with a second portion protruding toward the recording medium from the medium opposing surface so that the peripheral area of the protective film around the projection protrudes toward the recording medium from the medium opposing surface.

The head element layer has a plurality of projections protruding toward the recording medium from the medium opposing surface. Otherwise, the head element layer has at least one (first) projection, and the protective layer or the flying layer is provided with at least one second projection protruding toward the recording medium from the medium opposing surface.

The projection is made of diamond-like carbon (DLC).

A part of the head element layer is also provided with at least one rail protruding toward the medium opposing surface.

There are a plurality of the head element layers which define a plurality of rails protruding toward the medium opposing surface.

According to another aspect of the present invention, there is provided a process for manufacturing a magnetic head slider comprising an actuator section comprising a protective film, a flying surface layer, a head element layer and an actuator layer; and a slider body section; and also head slider being adapted to be opposed to a recording medium; the process comprising: forming a sacrifice layer on a substrate; forming on the sacrifice layer the protective layer, the flying surface layer, the head element layer and the actuator layer, in addition forming a slider body layer on the actuator layer; and removing the sacrifice layer to separate the head slider from the substrate so that the protective film defines a medium opposing surface for opposing against a recording medium; characterized in that the process further comprises: providing at least one of the sacrifice layer and the substrate with a recess, so that when the head slider is formed on the sacrifice layer or on the substrate, a part of the head element layer forms at least one projection, due to the recess, so as to protrude from the medium opposing surface.

The recess is formed by chemical etching. Otherwise, the recess is formed by ion milling.

BRIEF DESCRIPTION OF THE DRAWINGS

FIG. 9(a) is a plan view showing an embodiment of the magnetic head slider having a plurality of pads;

FIGS. 9(b) and 9(c) are cross-sectional views of the magnetic head slider having a plurality of pads in the case of loading; and FIGS. 10(a) to 10(d) are plan views showing various embodiments of the magnetic head slider having a plurality of rails (pads).

DETAILED DESCRIPTION OF THE PREFERRED EMBODIMENTS

Figure 1A:
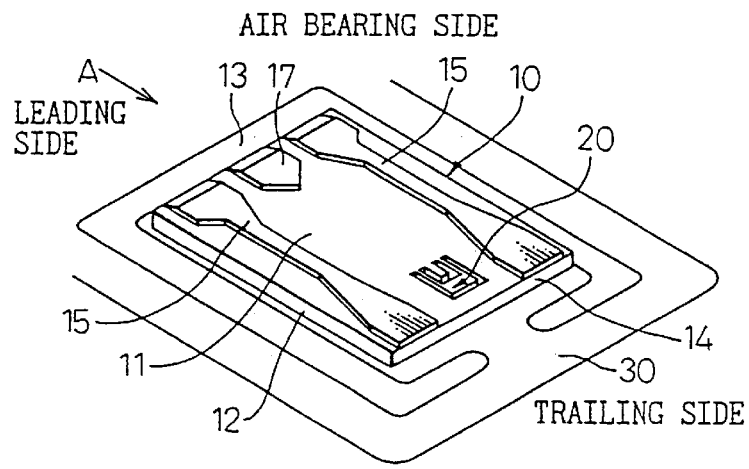
FIG. 1(a) is a perspective view of the conventional magnetic head slider, seen from the flying surface side.
Figure 1B:
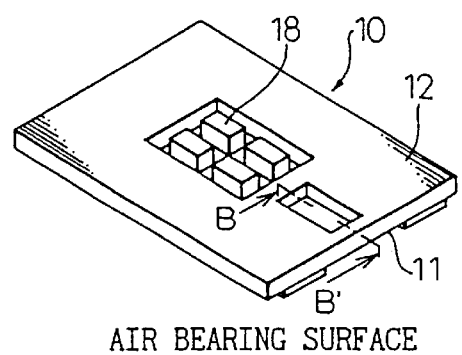
FIG. 1(b) is a perspective view of the conventional magnetic head slider, seen from the back.
Figure 1C:
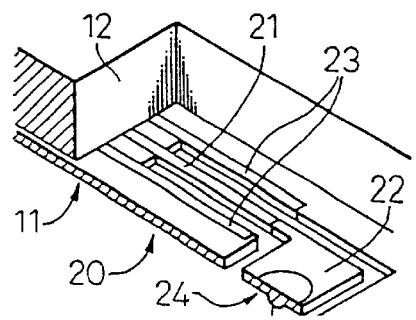
FIG. 1(c) is a view showing a cross-section taken on line B–B' in FIG. 1(b)
Figure 2:
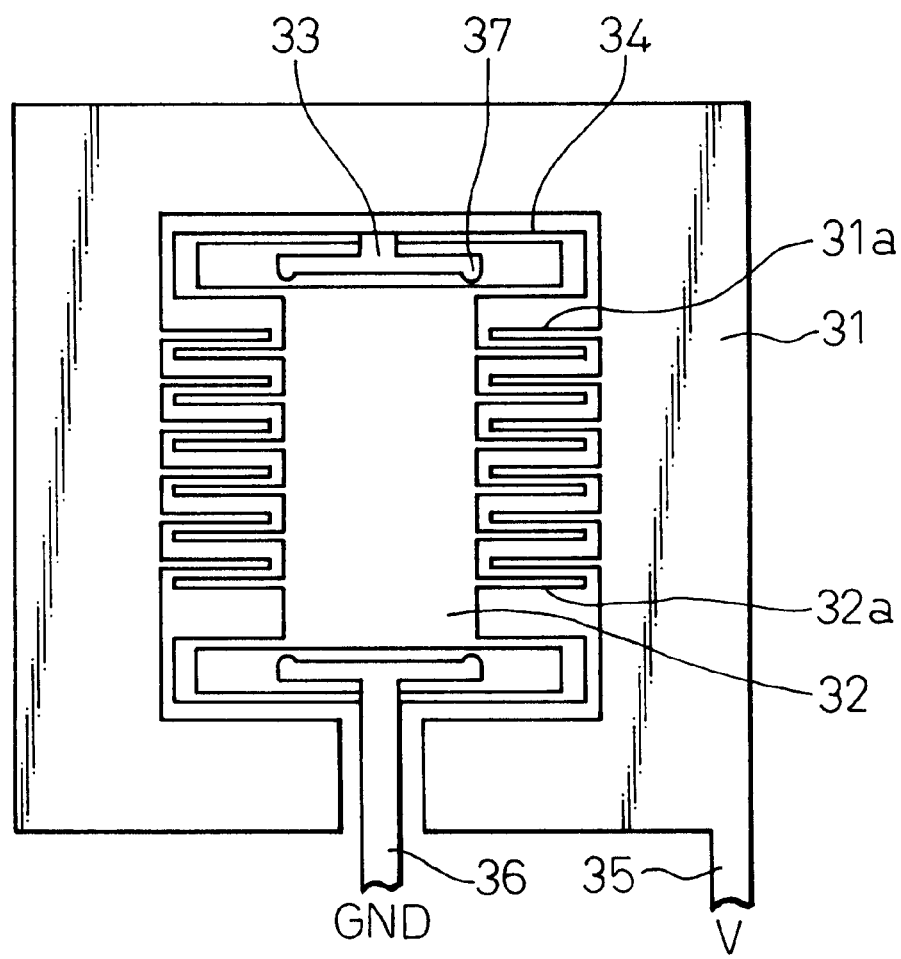
FIG. 2 is a plan view of an electrostatic actuator of the conventional magnetic head slider.
Figure 3:
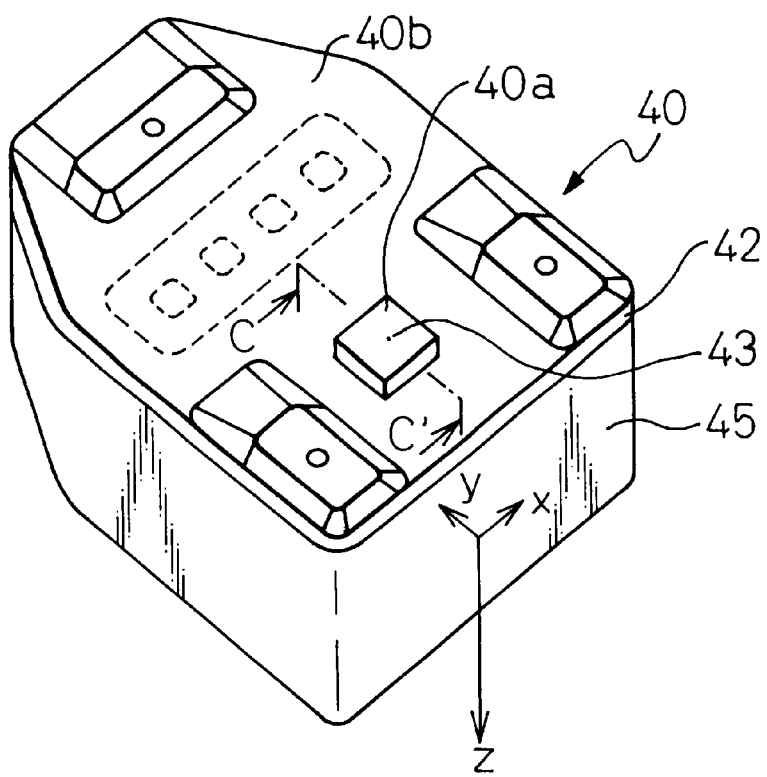
FIG. 3 is a perspective view of the conventional magnetic head slider of another type, seen from the flying surface side.
Figure 4:
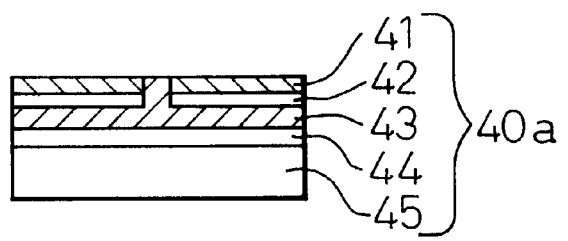
FIG. 4 is a cross-sectional view of an actuator of the conventional magnetic head slider shown in FIG. 3.
Figure 5A:
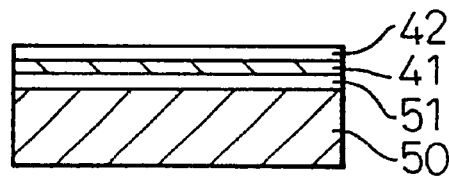
FIGS. 5(a) to 5(d) are views showing a manufacturing process of the actuator of the conventional magnetic head slider.
Figure 5B:
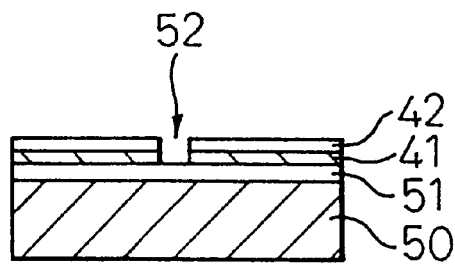
Figure 5C:
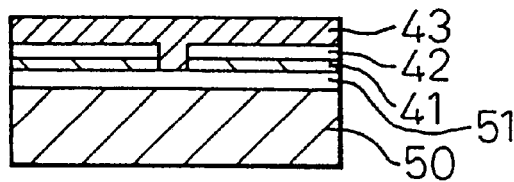
Figure 5D:
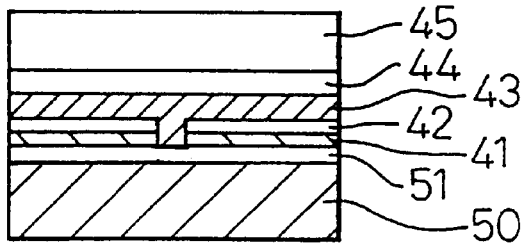
Figure 6:
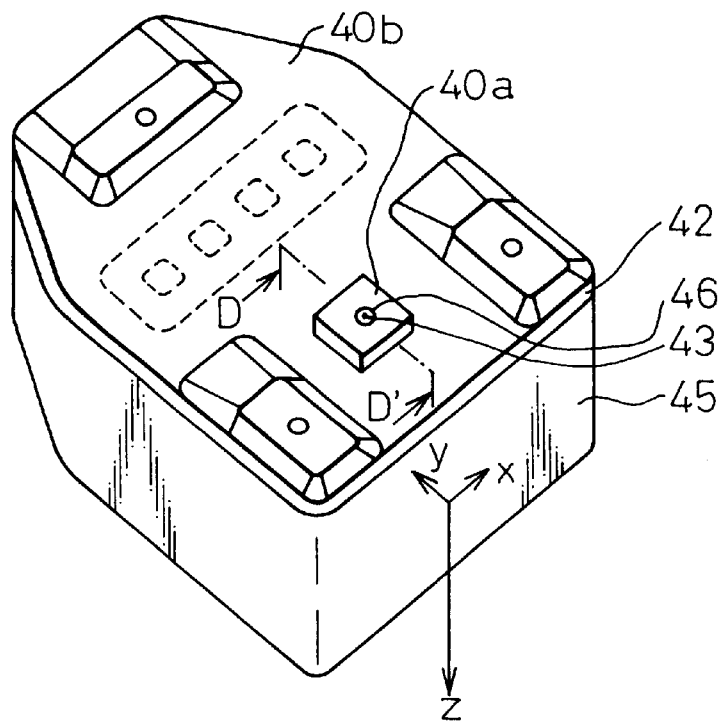
FIG. 6 is a perspective view of the magnetic head slider of the present invention, seen from the flying surface side.
Figure 7:
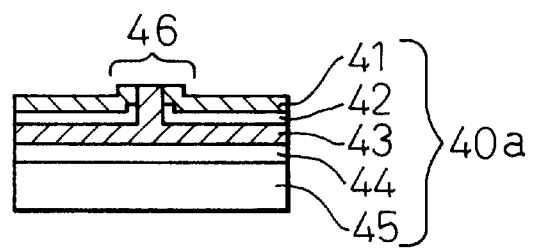
FIG. 7 is a cross-sectional view of an actuator of the magnetic head slider of the present invention shown in FIG. 6.

FIG. 6 is a perspective view showing an entire magnetic head slider of the present invention. FIG. 7 is a cross-sectional view showing an electrostatic actuator. The structure will now be described. FIGS. 8(a) to 8(e) show a manufacturing process of the actuator.

On the substrate 50, there are provided a sacrifice layer 51, protective layer 41, flying surface (air bearing surface) layer 42, head element layer 43, actuator layer 44, and slider body 45 in this order. The magnetic head slider 40 is composed of the above films. A leading end portion 43a of the head element layer 43 forms a portion of the protrusion 46 and protrudes onto the side opposed to the recording medium.

The size of the magnetic head slider 40 is assumed to be not more than 08T. The size of the flying surface of the 08T magnetic head slider 40 is approximately 800 µm×600 µm. The thickness of the 08T magnetic head slider 40 is approximately several tens to several hundreds µm. The outer diameter of the electrostatic actuator shown in FIG. 6 is approximately 100 µm square.

Referring to FIGS. 8(a) to 8(e), an example of the manufacturing process of the magnetic head slider of the present invention will be shown below, wherein an explanation of the electrostatic actuator 40a should be stressed.

Figure 8A:
FIGS. 8(a) to 8(e) are views showing a manufacturing process of the actuator of the magnetic head slider of the present invention.

(1) A sacrifice layer 51 made of Al, the thickness of which is approximately 1 µm, is formed on all surfaces of the glass substrate 50. This sacrifice layer 51 is provided for the purpose of separating the substrate 50 from the slider 40 by etching as shown in FIG. 8(a).

Figure 8B:
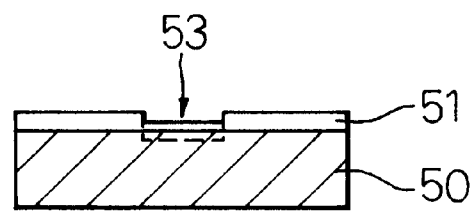

(2) A recess 53, which becomes a protrusion 46 in the later process, is formed on this sacrifice layer 51 by means of etching as shown in FIG. 8(b). This recess 53 may penetrate into the substrate 50 as shown by a broken line in the drawing.

In this case, the protrusion 46, the height of which is several nm to several tens nm and the diameter of which is several μm to several tens μm, is composed of a protective layer 41, flying surface layer 42 and head element layer 43.

Figure 8C:
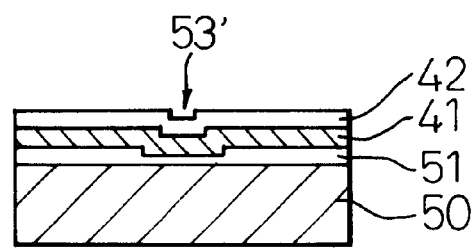

(3) The protective layer 41 and the flying surface layer 42 are formed on the overall surface including the actuator and this recess 53 by means of sputtering and CVD as shown in FIG. 8(c). At this time, a recess 53' corresponding to the recess 53 is formed on the flying surface layer 42. In this case, examples of the usable protective film 41 are: a sputtered carbon film (diamond-like-carbon (DLC): 10 nm thickness), and a carbon film formed by plasma CVD. The above protective films have abrasion resistance when they come close to or contact with a recording medium. An example of the flying surface layer 42 is a film of $SiO_2$, the thickness of which is several μm. The flying surface layer 42 forms a surface of the slider 40. In this flying surface layer 42, there are provided electric wires (not shown) for supplying electricity to the head element 43 and the actuator layer 44.

Figure 8D:
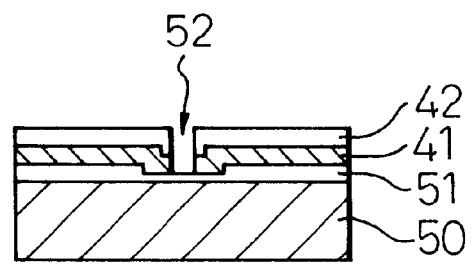

(4) In order to form a hole 52, a portion of the protective layer 41 is removed by means of ion milling, and also a portion of the flying surface layer 41 is removed by means of ion milling as shown in FIG. 8(d). In this connection, the diameter of this hole 52 is smaller than that of the recess 53, and this hole 52 penetrates the protective layer 41 and stops on the top surface of the sacrifice layer 51.

Figure 8E:
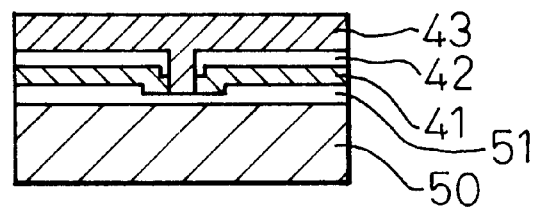

(5) The head element 43 is formed so that a leading end portion of the head element 43 comes into the hole 52 as shown in FIG. 8(e).

The head element 43 is composed of a horizontal head or MR head and exchanges signals with the recording medium, so that information can be read and written.

(6) After this, the same process as that of the conventional example is conducted. That is, the actuator layer 44 and the slider body 45 are subjected to plating, for example, plating of Ni via a plating base, and the magnetic head slider 40 having an actuator is formed.

In this case, the actuator layer 44 and the slider body 45 are formed by the plated layers of Ni. The actuator layer 44, the thickness of the plated layer of which is several μm, on which the head element 43 is mounted, moves into the tracking direction and follows the track of the recording medium, and at the same time the actuator layer 44 drives in the upward and downward direction, so that the head element 43 can be loaded and unloaded. The slider body 45, the thickness of which is approximately 100 μm, on which the actuator layer 44 and the head element layer 43 are mounted, flies above the recording medium at a distance of 0.1 to 0.2 μm.

Consequently, the layers from the protective film layer 41 to the slider body 45 compose a component of the magnetic head slider 40.

(7) When the sacrifice layer 51 is removed by means of etching, for example etching in a solution of KOH, the magnetic head slider 40 is separated from the substrate 50. In this way, the magnetic head slider 40 (electrostatic actuator 40a) of the present invention shown in FIG. 7 is completed.

Next, operation of the magnetic head slider of the present invention will be explained below. As shown in FIG. 7, the head element 43 in the protrusion 46 protrudes on the side which is opposed to the recording medium, together with the protective layer 41 and the flying layer 42.

In the magnetic head slider 40 described above, when the electrostatic actuator 40a is loaded and unloaded, the head element 43 can be made to come close to, or in contact with, the recording medium. When the head element 43 is made to contact the recording medium, the entire electrostatic actuator 40a does not contact the recording medium, but only the protrusion 46 contacts the recording medium, and reading and writing is conducted by the head element 43. When the head element 43 is made to come close to the recording medium, the same phenomenon as that of contact occurs. In the case of contact, when the electrostatic actuator 40a is driven into the tracking direction, a frictional force is generated so as to resist the drive of the electrostatic actuator 40a. However, since the contact area of the protrusion 46 with the recording medium is small, the frictional force does not obstruct the drive force of the electrostatic actuator 40a. Therefore, the head element 43 can follow the track accurately.

FIGS. 9(a) to 9(c) are views showing the other embodiments of the present invention. In the before-mentioned embodiment, one protrusion 46 covers the reading and the writing section of the head element 43. That is, only one protrusion 46 is provided. However, it is possible to provide an arrangement in which, except for the head element section 43, one or a plurality of protrusions 47 are arranged as shown in FIG. 9(a).

When the protrusion 46 for reading and writing comes into contact with the recording medium in the case of loading, a frictional force in the trailing end direction is generated because the recording medium 60 is rotated. There is a possibility that the actuator 40a is excessively inclined by the above frictional force and collides with the recording medium and is damaged. Occurrence of this problem can be prevented by another protrusion 47 when it comes into contact with the recording medium 60 as shown in FIG. 9(b). Accordingly, the actuator 40a can be stabilized when it flies on or comes into contact with the recording medium in the case of loading.

FIGS. 10(a) to 10(d) are views showing still another embodiment of the present invention. In the case where the reading section and the writing section of the head element 43 are separate from each other, it is possible to adopt such an arrangement that one protrusion 46 covers the reading section and the other protrusion 47 covers the writing section as shown in FIG. 10(a).

In the above embodiment, the head element is formed into the protrusion 46, however, the head element may be formed into a rail-shape 48 as shown in FIGS. 10(b), 10(c) and 10(d). When a load given into the tracking direction is not so high, the head element formed into the rail-shape is advantageous in that the abrasion resistance is enhanced because the contact area is large.

The effects provided by the arrangements in which the rails 48 are arranged as shown in FIGS. 10(a), 10(b), 10(c) and 10(d) are the same as those of the arrangements in which the protrusions 46 are arranged.

At the leading end portion of the protrusion 46 in the above embodiment, the head element 43 is exposed onto the surface. However, it is possible to cover the head element 43 with a protective film so that it cannot be exposed. This arrangement is advantageous in that the head element 43 can be protected from the environment and the abrasion resistance can be enhanced. This protective film may be formed simultaneously with the aforementioned protective film 41. Alternatively, this protective film may be formed after the separation of the slider.

The shape and number of the protrusions 46 and rails 48 are not limited to the above specific embodiment, but various shapes may be adopted except for the above embodiment. It is also possible to combine the protrusion 46 with the shape of the rails 48.

As explained above, the following effects can be provided by the present invention. According to the arrangement of the magnetic head slider of the present invention, the head element 43 in the protrusions 46 of the electrostatic actuator 40*a* protrudes from the periphery onto the surface which is opposed to the recording medium. Therefore, in the case of loading of the electrostatic actuator 40*a*, only the protrusion 46 comes into contact with the recording medium. Accordingly, a frictional force generated in the case of driving in the tracking direction is reduced. Therefore, it is possible for the head element 43 to follow the track accurately.

When the protrusion 46 comes into contact with the recording medium in the case of loading, a frictional force is generated in the outflow end direction because the recording medium is rotated. There is a possibility that the actuator 40*a* is excessively inclined and damaged by this frictional force. However, since another protrusion 47 comes into contact with the recording medium, the above problem can be solved, and further it is possible to enhance the stability of flying and contact.

What is claimed is:

1. A magnetic head slider adapted to be opposed to a recording medium comprising:

an actuator section including a protective film, a flying surface layer, a head element layer and an actuator layer; and a slider body section;

wherein said head slider is made by forming a sacrifice layer on a substrate, then forming on the sacrifice layer said protective film, said flying surface layer, said head element layer and said actuator layer, in addition forming a slider body layer on said actuator layer, then removing said sacrifice layer to separate said head slider from said substrate so that said protective film defines a medium opposing surface for opposing against a recording medium;

wherein a part of said head element layer is provided with at least one first projection protruding through said flying surface layer and said protective layer toward the recording medium from said medium opposing surface.

2. A magnetic head slider as set forth in claim 1, wherein said protective film is provided at a peripheral area around said first projection with a first portion protruding toward the recording medium from said medium opposing surface so that said portion defines a second projection around and integral with said first projection.

3. A magnetic head slider as set forth in claim 1, wherein said flying surface layer is provided at a peripheral area around said first projection with a second portion protruding toward the recording medium so that a peripheral area of the protective film around said first projection protrudes toward the recording medium, so that a second projection is defined around and integral with said first projection.

4. A magnetic head slider as set forth in claim 1, wherein said first projection is made of a diamond-like carbon.

5. A magnetic head slider adapted to be opposed to a recording medium comprising:

an actuator section including a protective film, a flying surface layer, a head element layer and an actuator layer; and a slider body section;

wherein said head slider is made by forming a sacrifice layer on a substrate, then forming on the sacrifice layer said protective layer, said flying surface layer, said head element layer and said actuator layer, in addition forming a slider body layer on said actuator layer, then removing said sacrifice layer to separate said head slider from said substrate so that said protective film defines a medium opposing surface for opposing against a recording medium;

wherein said head element layer has a plurality of projections protruding toward the recording medium from said medium opposing surface.

6. A magnetic head slider as set forth in claim 5, wherein said protective film is provided at a peripheral area around at least one of said projections with a portion protruding toward the record medium from said medium opposing surface, so that said portion defines a part of said projection.

7. A magnetic head slider as set forth in claim 5, wherein said flying surface layer is provided at a peripheral area around at least one of said projections with a portion protruding toward the recording medium from said medium opposing surface, so that a second projection is defined around and integral with said at least one projection.

8. A magnetic head slider as set forth in claim 5, wherein said at least one projection is made of diamond-like carbon.

9. A magnetic head slider adapted to be opposed to a recording medium comprising:

an actuator section including a protective film, a flying surface layer, a head element layer and an actuator layer; and a slider body section;

wherein said head slider is made by forming a sacrifice layer on a substrate, then forming on the sacrifice layer said protective layer, said flying surface layer, said head element layer and said actuator layer, in addition forming a slider body layer on said actuator layer, then removing said sacrifice layer to separate said head slider from said substrate so that said protective film defines a medium opposing surface for opposing against a recording medium;

wherein a part of said head element layer is provided with at least one first projection protruding toward the recording medium from said medium opposing surface; and at least one of said protective layer and said flying surface layer is provided with at least one second projection protruding toward the recording medium from said medium opposing surface.

10. A magnetic head slider as set forth to claim 9, wherein said at least one first projection is made of diamond-like carbon.

* * * * *